United States Patent Office 2,950,760
Patented Aug. 30, 1960

2,950,760
WATER FLOODING PROCESS

George G. Bernard, Crystal Lake, Ill., assignor to The Pure Oil Company, Chicago, Ill., a corporation of Ohio No Drawing. Filed May 2, 1958, Ser. No. 732,455

10 Claims. (Cl. 166—42)

This invention relates to a method for recovering oil from subterranean petroleum reservoirs, and is more particularly concerned with an improved water-flooding process.

It is well-known in the art to use surfactants in water-flooding operations to increase the recovery of residual oil from underground petroleum reservoirs. The art also recognizes the advantage of increasing the viscosity of the flood water to a point where it approaches that of the oil to be displaced from the formation. For example, in Detling Patent No. 2,341,500, soaps such as sodium oleate are mixed with water to increase the ratio of the viscosity of the water to that of the oil. The disadvantage of a process such as that disclosed by Detling is that the increase in the viscosity of the flood water increases the difficulty of injecting it, with the result that either higher pressures must be used or the rate of injection is slowed down.

My invention resides in the discovery that certain types of compounds can be added to water which do not substantially increase the viscosity of the water when the water is in neutral or acidic condition but which significantly raise the viscosity of the water when the water becomes alkaline. It is, therefore, possible to inject the water containing the viscosity-altering chemical in a state of low viscosity and change it to a state of high viscosity in the formation either by virtue of contact of the water with alkaline substances naturally occurring in the formation, or by injection of alkaline water ahead of the water containing the viscosity-altering constituent.

It is an object of this invention to provide an improved method for flooding underground petroleum reservoirs. Another object of this invention is to provide a method for recovering residual oils in natural underground petroleum reservoirs. A further object of this invention is to provide a method for injecting a low viscosity, surfactant-containing flooding liquid into an oil reservoir and increasing its viscosity after it has entered the reservoir formation. Other objects of the invention will appear from the following description.

In accordance with my invention, there is added to the flood-water which is injected into a natural reservoir containing residual oil, water containing a small amount of one or more salts of N-substituted aminopropionic acid. Such compounds are at present manufactured by General Mills Corporation and marketed under the name "Deriphats." These substances are disclosed in "Soap and Chemical Specialties," January, 1958 issue, at page 50. Compounds which are useful in accordance with my invention are of the general type comprising water-soluble metal, ammonium, and substituted-ammonium salts of beta-aminopropionic acid (B-alanine) in which a fatty radical derived from a fatty acid has replaced one of the amino hydrogen atoms. Examples of these are sodium lauryl beta-aminopropionate (sodium lauryl beta-alanine), triethanolamine lauryl beta-aminopropionate, sodium stearyl beta-aminopropionate, and sodium tallow beta-aminopropionate. Compounds of this kind are distinctive for the purpose. Water-soluble, metal, ammonium, and substituted-ammonium salts of beta-iminodipropionic acid in which a fatty radical derived from a fatty acid has replaced the imino hydrogen atom are ineffective. Instead of sodium salts, water-soluble salts of other metals, such as potassium, or salts of organic bases may be used.

These compounds undergo a change in viscosity with change in pH with the result that the viscosity of the aqueous solutions increases significantly as the solution becomes more basic, up to a certain point, and then the viscosity again reduces as the basicity increases. This phenomenon is demonstrated by the following table, which shows the change in viscosity with change in pH of aqueous solutions containing several compounds at different concentrations.

Table I

| Compound | Conc. (percent w.) | Viscosity in centipoises at pH of— | | | | | |
|---|---|---|---|---|---|---|---|
| | | 2 | 6 | 7 | 8 | 9 | 10 |
| Sodium lauryl beta-amino-propionate (Deriphat 170). | 1 | 1.3 | 2.5 | 2.0 | 1.7 | 1.4 | 1.1 |
| | 3 | 2.4 | 20.2 | ----- | 49 | ----- | 18 |
| | 10 | ----- | 20 | 20 | 120 | 280 | 20 |
| Sodium coco beta-amino-propionate (Deriphat 181). | 1 | ----- | 1.3 | 1.3 | 1.2 | 1.1 | 1.1 |
| | 5 | ----- | 6.5 | 4.8 | 4.4 | 3.9 | 1.3 |
| | 10 | ----- | 28.3 | 20.4 | ----- | 16.5 | 1.7 |
| Triethanol-amine lauryl beta-amino-propionate (Deriphat 170B). | 1 | ----- | 1.4 | 1.3 | 1.2 | 1.1 | 1.2 |
| | 5 | ----- | 9.7 | 6.6 | 1.9 | 1.9 | 1.2 |
| | 10 | ----- | 47 | 92 | 19 | 3.4 | 1.2 |

In carrying out my invention I use solutions containing an effective amount of aminopropionate, acidified to a pH lower than the pH at which maximum viscosity is attained. Effective concentrations range from about 1 to 10% w., with the most effective concentration being dependent upon the particular aminopropionate chosen.

For example, if a crude oil having a viscosity of about 20 centipoises is to be flooded from a formation, I use about 3% w. sodium lauryl beta-aminopropionate, about 8% w. sodium coco-beta-aminopropionate, or about 6.5% w. triethanolamine lauryl beta-aminopropionate. In each of these cases, I acidify the solution to a pH of about 2 before injecting it into the formation. Then, when the pH increases within the formation as the acid becomes neutralized, the viscosity of the solution increases to about 20 centipoises, or substantially equal to that of the oil.

The unexpectedly unique effectiveness of the salts of beta-aminopropionic acid is demonstrated by comparison of the viscosity-pH-concentration relationships of solutions of the closely-related salts of beta-iminodipropionic acid. These relationships are given in Table II below.

Table II

| Compound | Conc. (percent w.) | Viscosity in centipoises at pH of— | | | | |
|---|---|---|---|---|---|---|
| | | 6 | 7 | 8 | 9 | 10 |
| Disodium tallow beta-imino-dipropionate (Deriphat 154). | 10 | 1.4 | 1.4 | 1.5 | 1.4 | 1.4 |
| Disodium lauryl beta-imino-dipropionate (Deriphat 160). | 10 | 1.5 | 1.5 | 1.5 | 1.5 | 1.5 |

It can be seen that the viscosities of solutions of these compounds are not sensitive to variations in pH within practical limits of pH and concentration.

In carrying out the invention, I prefer to acidify the aminopropionate solution to a pH of about 2 to 5. Any suitable acid, such as hydrochloric, phosphoric, or acetic acid, may be used for this purpose, provided it does not itself have an adverse effect on the aminopropionate. Lower pH values may be employed in order to permit use of higher concentrations of the salt in the solution, but it is preferred to select a salt and concentration which minimizes the acidification necessary, in order to reduce corrosion problems. The pH of the solution should not be in excess of 7 at the time of injection. The formations with which the injected solutions come into contact usually contain basic substances, such as calcium carbonate, which gradually increase the pH of the solution and thereby increase its viscosity. The solution injected has a dual effect, one as a surfactant and the other as a viscous driving fluid to displace the oil from the formation.

In the event it is desired to flood a formation which is not basic in character, a dilute solution of caustic soda, lime, or other base may be injected ahead of the aminopropionate salt solution so that when the two meet, the pH of said solution will be raised and result in thickening same.

In order to illustrate the invention, a sandstone core sample containing 0.60 pore volume of oil, and having a viscosity of 100 cp. and 0.4 pore volume of water, was subjected to conventional flooding until the water-oil ratio produced was 25 to 1. Only 24% of the oil present was recovered. In a second test a sandstone core sample was flooded with water to which a surfactant had been added to reduce the interfacial tension between the reservoir oil and flood water to below 3 dynes/cm. In this case 48% of the oil present was recovered.

In accordance with this invention, when a sandstone (non-basic) core is first treated with an aqueous lime solution, and then is flooded with water containing 3% of Deriphat 170 (98% aqueous solution of sodium lauryl beta-aminopropionate) and sufficient hydrochloric acid to bring the pH of the solution to about 2.0, over 50% of the oil in place is recovered.

It will be seen, therefore, that I have devised a novel method for recovering increased amounts of residual oil in natural subterranean formations by the use of a surfactant which imparts increased viscosity to the flood water with change in pH value, in a method comprising injecting the flood water at low viscosity and increasing its viscosity after it has entered the producing formation.

I claim as my invention:

1. The method of recovering oil from a natural subterranean formation comprising injecting into said formation water containing in solution at least one salt from the group consisting of alkali metal, ammonium, and substituted-ammonium salts of a substituted beta-aminopropionic acid in which a fatty radical is a substituent replacing one of the amino hydrogen atoms, said solution being acidified to a pH not greater than about 7.

2. The method in accordance with claim 1 in which the compound is present in solution in an amount of about 1–5% by weight.

3. The method in accordance with claim 1 in which the compound is sodium lauryl beta-aminopropionate.

4. The method in accordance with claim 1 in which the pH of the solution when injected is about 4 to 5.

5. The method in accordance with claim 1 in which the viscosity of the solution when injected is about 2 centipoises.

6. The method in accordance with claim 1 in which a basic reagent having a pH greater than 7 is injected into the formation ahead of said solution.

7. The method of recoverying residual oil in a subterranean oil-producing formation comprising injecting into said formation a non-basic aqueous solution containing at least one compound from the group consisting of alkali metal, ammonium, and substituted-ammonium salts of a substituted beta-aminopropionic acid in which a fatty radical containing about from 10 to 24 carbon atoms is a substituent replacing one of the amino hydrogen atoms, such compound being present in an amount sufficient to significantly increase the viscosity of the solution when its pH is at least 8, but insufficient to materially increase the viscosity of water when the solution is acidic.

8. The method in accordance with claim 7 in which a basic reagent having a pH greater than 7 is injected ahead of said solution.

9. The method in accordance with claim 7 in which the compound is sodium lauryl beta-aminopropionate.

10. The method in accordance with claim 8 in which the compound is present in amount of about 1–5% by weight and the pH of the solution when injected is about 2–5.

References Cited in the file of this patent

UNITED STATES PATENTS

| | | |
|---|---|---|
| 2,341,500 | Detling | Feb. 8, 1944 |
| 2,468,012 | Isbel | Apr. 19, 1949 |
| 2,827,964 | Sandiford et al. | Mar. 25, 1958 |
| 2,843,545 | Wolf | July 15, 1958 |